(12) United States Patent
Lu et al.

(10) Patent No.: US 7,633,266 B2
(45) Date of Patent: Dec. 15, 2009

(54) CHARGER CIRCUIT AND TRANSFORMER USED THEREIN

(75) Inventors: Shu-Zhuang Lu, Shanghai (CN);
Chao-Qun Sun, Shanghai (CN)

(73) Assignee: BCD Semiconductor Manufacturing Limited, Grand Cayman (KY)

( * ) Notice: Subject to any disclaimer, the term of this patent is extended or adjusted under 35 U.S.C. 154(b) by 527 days.

(21) Appl. No.: 11/649,855

(22) Filed: Jan. 5, 2007

(65) Prior Publication Data

US 2008/0164837 A1   Jul. 10, 2008

(51) Int. Cl.
*H02J 7/04* (2006.01)
*H02M 3/335* (2006.01)
*G05F 1/00* (2006.01)

(52) U.S. Cl. .................. 320/140; 320/141; 320/145; 363/21.12; 363/21.15; 323/284; 323/344

(58) Field of Classification Search .................. 320/140, 320/141, 145, 132, 137; 363/95, 97, 98, 363/16, 132, 21.12, 21.15; 323/284, 344, 323/220, 287, 323
See application file for complete search history.

(56) References Cited

U.S. PATENT DOCUMENTS 6,747,883 B2 *  6/2004  Yasumura ............... 363/98
2007/0013344 A1 *  1/2007  Aradachi et al. ........... 320/132

* cited by examiner

*Primary Examiner*—Edward Tso
*Assistant Examiner*—Alexis Boateng
(74) *Attorney, Agent, or Firm*—Muncy, Geissler, Olds & Lowe, PLLC

(57) ABSTRACT

The present invention discloses a transformer used in a charger circuit, in which the input side of the transformer is connected to an AC input and PWM control circuit of the charger circuit, the output side of the transformer is connected to a constant current and/or constant voltage control circuit of the charger circuit. The AC input, PWM control circuit, the constant current and/or constant voltage control circuit are coupled through an optical coupling element, wherein the transformer includes a main output winding and an auxiliary output winding, and the auxiliary output winding is used to supply power for the optical coupling element and the constant current and/or constant voltage control circuit. The present invention further provides a high performance charger circuit adopting the transformer described above for improving electromagnetic compatibility, conversion efficiency and short circuit characteristic.

10 Claims, 9 Drawing Sheets

CHARGER CIRCUIT AND TRANSFORMER USED THEREIN

FIELD OF THE INVENTION

The present invention is related to a charger circuit, and to a special transformer.

BACKGROUND OF THE INVENTION

Most chargers used in mobile phone and digital cameras adopt switch mode power supply (SMPS). Generally, these charger SMPS includes AC input and PWM control circuit, transformer and constant current/voltage control circuit, wherein the AC input, PWM control circuit, constant current and/or constant voltage control circuit are coupled through an optical coupling element. The input side of the transformer is connected to the AC input and PWM control circuit; the output side of the transformer is connected to the constant current/voltage control circuit of the charger. All these circuits adopt step-down transformer and the output side of this kind of transformer usually has only one single winding. In the prior arts described above, the transformer generally utilizes two kinds of output control circuits, one is an output control circuit constituted by the dual operational amplifier and the voltage stabilizing circuit and the other is an output control circuit constituted by the voltage stabilizing circuit to achieve constant voltage and a transistor to achieve the constant current.

FIGS. 1A, 1B and FIGS. 2A, 2B are circuit diagrams showing two kinds of charger circuits in the prior arts.

Please refer to FIG. 1A, which shows a first kind of common charger circuit 100A. The circuit 100A includes an AC input and PWM control circuit 102, a transformer T1, a constant current control circuit 104, and a constant voltage control circuit 106, wherein the constant current control circuit 104 and the constant voltage control circuit 106 are coupled with the AC input and PWM control circuit 102 through an optical coupling element U3. In the charger circuit 100A, the input side of the transformer T1 has an input coil 101a and an input auxiliary coil 101b, and the output side thereof has an output coil 101c, which first terminal is series connected to the second terminal of the coil 101c through a diode D9 and a capacitor C9, wherein the first terminal of the output coil 101c is connected to the positive electrode of the diode D9. In the circuit 100A, resistors RV1 and RV2 are for voltage stabilizing to achieve constant voltage, resistor R10 and capacitor C7 are voltage compensative elements, resistor R9 and capacitor C8 are current compensative elements, RI is to achieve constant current, and other elements including capacitor C11, resistors R8 and R17, are auxiliary electronic elements.

FIG. 1B shows a charger circuit 100B which is the extended design of the charger circuit 100A shown in FIG. 1A, in which some auxiliary elements are added. Please refer to FIG. 1B, the charger circuit 100B includes an AC input and PWM control circuit 102, a transformer T1, a constant current control circuit 104, and a constant voltage control circuit 106, wherein the constant current control circuit 104 and the constant voltage control circuit 106 are coupled with the AC input and PWM control circuit 102 through an optical coupling element U3. In the charger circuit 100B, the input side of the transformer T1 has an input coil 101a and an input auxiliary coil 101b, and the output side thereof has an output coil 101c, which first terminal is series connected to the second terminal of the coil 101c through a parallel circuit and a capacitor C9, wherein the parallel circuit includes a first branch circuit constituted by capacitor C12 and resistor R18, and a second branch circuit constituted by diode D9, and the first terminal of the output coil 101c is connected to the positive electrode of the diode D9. In the circuit 100B, resistors RV1 and RV2 are stabilizing resistors, resistor R10 and capacitor C7 are voltage compensative elements, resistor R9 and capacitor C8 are current compensative elements, RI is to achieve constant current, and other elements including capacitor C11, resistors R8 and R17, are auxiliary electronic elements. The circuit 100B further includes inductances L1 and L2 for filtering.

Referring to FIGS. 1A and 1B, the principles of the charger circuits 100A/B are similar, as followed: The output coil 101c generates output voltage rectified by the diode D9, the output voltage is divided by the resistors RV1/RV2 and connected to the voltage reference input terminal of the constant voltage control circuit 106. The constant current resistor RI senses the output voltage for providing constant current, wherein resistor R10 and capacitor C7 are voltage compensative elements, resistor R9 and capacitor C8 are current compensative elements, the power for the optical coupling element U3, the constant current control circuit 104 and the constant voltage control circuit 106 are directly supplied by the output side, that is, the power supply is obtained from the second terminal of the output coil 101c, and the inductances L1 and L2 are used for filtering and are dispensable elements. The charger circuit 100A/B are deficient in hardly controlled short circuit current and poor output characteristics.

FIGS. 2A and 2B show the second kind of charger circuit in the known technology. First, please refer to FIG. 2A, the difference between the charger circuit 200A and the circuit 100A shown in FIG. 1A is the peripheral circuits of the output coil 101c. The first terminal of the output coil 101c is connected to the second terminal of the output coil 101c through a series connected capacitor C9 and a parallel connected circuit, which includes a first branch circuit constituted by diode D9 and a second branch circuit constituted by excited circuit. In the embodiment shown in FIG. 2A, the excited circuit includes, in turn, diode D8, resistor R12 and capacitor C10, which are series connected, wherein the second terminal of the output coil 101c is connected to the negative electrode of the diode D9 and also to the positive electrode of the diode D8. As compared with the circuit 100A, in the circuit 200A, the excited circuit constituted by the diode D8, the resistor R12 and the capacitor C10 is added to supply power for the optical coupling element U3, the constant current control circuit 104, and the constant voltage control circuit 106. In the excited circuit, the positive electrode of the diode D8 is connected to the second terminal of the output coil 101c, the negative electrode of the diode D8 is connected to both the resistor R12 and the capacitor C10, which are series connected, and the other end of the capacitor C10 is connected to the capacitor C9, and further, a connecting point located between the resistor R12 and the capacitor C10 is drawn out for providing power to the optical coupling element U3, the constant current control circuit 104, and the constant voltage control circuit 106. The charger circuit 200A can improve the performance of short circuit and output characteristic, but the EMC characteristic becomes worse.

Please refer to FIG. 2B, in which the charger circuit 200B is the extended design of the charger circuit 200A shown in FIG. 2A. Comparing the circuit 200B and 100B, the difference is the peripheral circuit of the output coil 101c. The first terminal of the output coil 101c is connected to the second terminal of the output coil 101c through a series connected capacitor C9 and a parallel connected circuit, which includes a first branch circuit constituted by diode D9, a second branch circuit constituted by capacitor C12 and resistor R18, which are series connected, and a third branch circuit constituted by excited circuit. In the embodiment shown in FIG. 2B, the excited circuit includes, in turn, diode D8, resistor R12 and capacitor C10, which are series connected, wherein the second terminal of the output coil 101c is connected to the negative electrode of the diode D9 and the second terminal thereof is connected to the positive electrode of the diode D8. As compared with the circuit 100B, in the circuit 200B, the excited circuit constituted by the diode D8, the resistor R12 and the capacitor C10 is increased for being the parallel connected third branch circuit and for providing power to the optical coupling element U3, the constant current control circuit 104, and the constant voltage control circuit 106. In the excited circuit, the positive electrode of the diode D8 is connected to the second terminal of the output coil 101c, the negative electrode of the diode D8 is connected to the resistor R12 and the capacitor C10, which are series connected, and the other end of the capacitor C10 is connected between the resistor R18 and the capacitor C9, and further, a connecting point located between the resistor R12 and the capacitor C10 is drawn out for providing power to the optical coupling element U3, the constant current control circuit 104, and the constant voltage control circuit 106. Although the charger circuit 200B can solve the problems of short circuit and poor output characteristic, the EMC characteristic also becomes worse.

Therefore, it is necessary to provide a new and high performance charger circuit with improved electromagnetic compatibility characteristic, high conversion efficiency and excellent short circuit characteristic.

SUMMARY OF THE INVENTION

The object of the present invention is to provide a high performance charger circuit with great electromagnetic compatibility characteristic, high conversion efficiency and excellent short circuit characteristic.

The present invention provides a transformer used in the charger circuit, in which the input side of the transformer is connected to an AC input and PWM control circuit, the output side of the transformer is connected to a constant current and/or constant voltage control circuit of the charger circuit. The AC input, PWM control circuit, constant current and/or constant voltage control circuit are coupled through an optical coupling element, wherein the transformer includes a main output winding and an auxiliary output winding, and the auxiliary output winding is used to supply power for the optical coupling element, the constant current and/or constant voltage control circuit.

The present invention also provides a charger circuit including an AC input, PWM control circuit, a transformer, a constant voltage and/or constant current control circuit, wherein the constant current, constant voltage control circuit, the AC input and PWM control circuit are coupled through an optical coupling element, the input side of the transformer is connected to the AC input and PWM control circuit of the charger circuit, and the output side of the transformer is connected to the constant current constant voltage control circuit of the charger circuit. Further, the transformer includes a main output winding and an auxiliary output winding, and the auxiliary output winding is used to supply power for the optical coupling element and the constant current constant voltage control circuit.

According to the present invention, the electromagnetic compatibility characteristic, the conversion efficiency and the short circuit characteristic all can be significantly improved.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DESCRIPTION OF THE PREFERRED EMBODIMENT

Figure 3A:
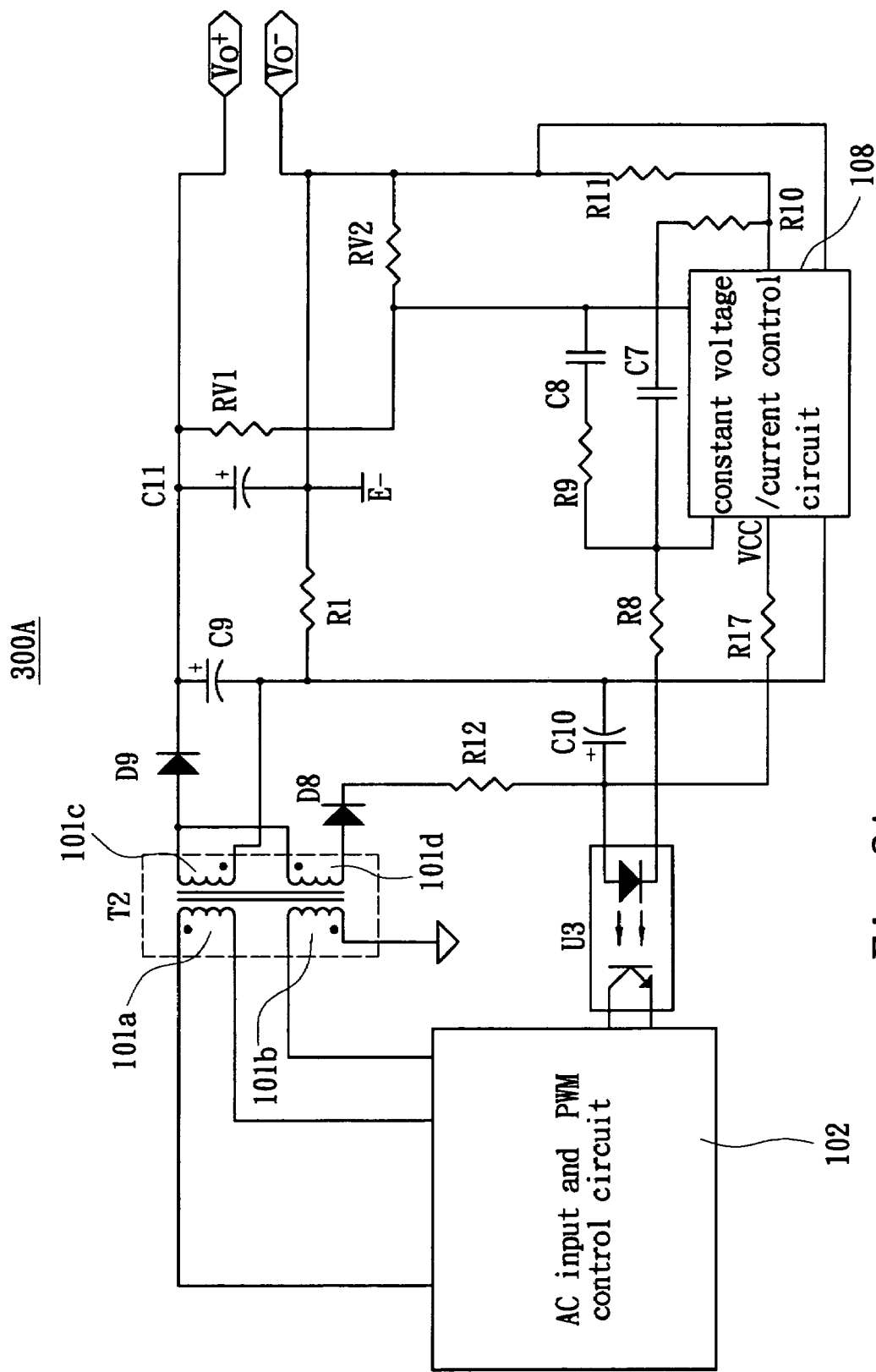
FIG. 3A is a circuit diagram showing a charger circuit in an embodiment according to the present invention.

FIG. 3A is a circuit diagram showing the charger circuit in a preferred embodiment according to the present invention. It should be noticed that, although FIG. 3A shows the practical application of the charger circuit, the transformer and the charger circuit are simultaneously explained in the description of FIG. 3A.

Figure 1A:
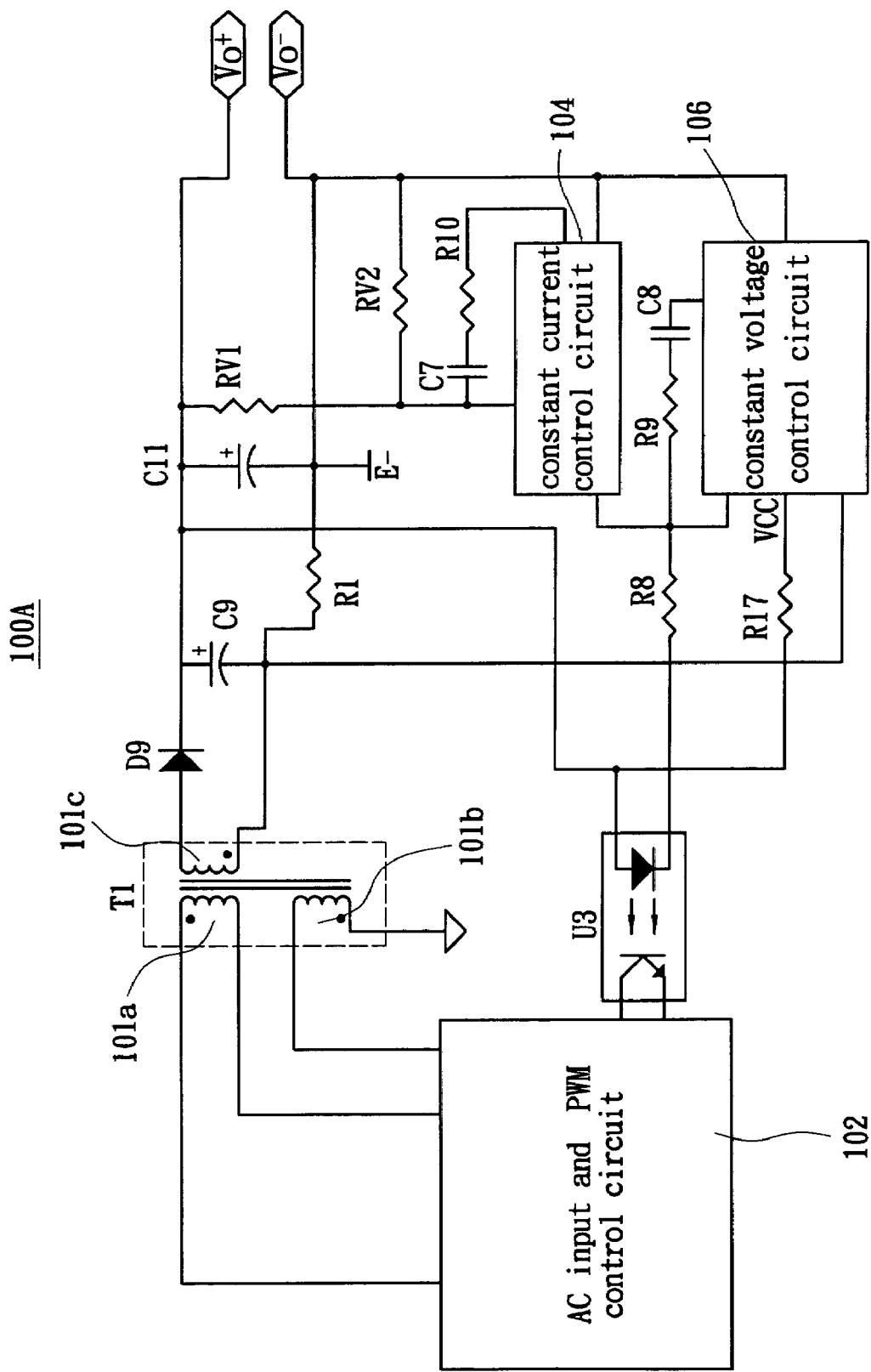
FIG. 1A is a circuit diagram showing a first kind of charger circuit in the prior art.
Figure 2A:
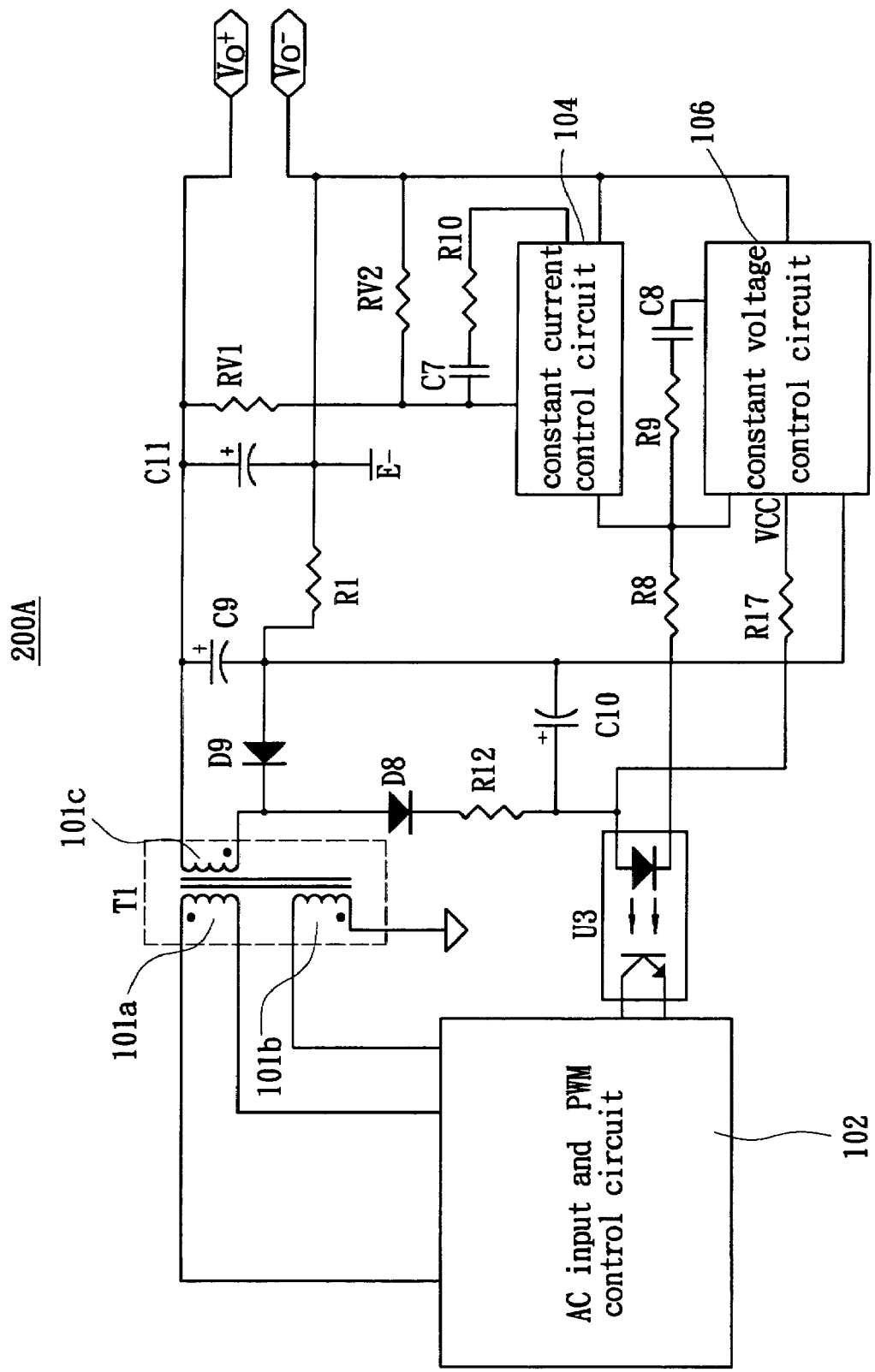
FIG. 2A is a circuit diagram showing a second kind of charger circuit in the prior art.

Please refer to FIG. 3A, comparing FIG. 3A with FIGS. 1A and 2A, the circuit 300A adopts a single constant current/voltage control circuit 108 to substitute the constant current control circuit 104 and the constant voltage control circuit 106, which are original separated. In the circuit 300A, resistors RV1 and RV2 are for voltage stabilizing, resistor R10 and capacitor C7 are voltage compensative elements, resistor R9 and capacitor C8 are current compensative elements, RI is resistor for constant current, and other elements, including capacitor C11, resistors R8, R17, are auxiliary electronic elements. Although all the elements described above are connected in a different way from those in FIGS. 1A and 2A, the principles thereof are identical for one skilled in the art.

The improvement of the charger circuit 300A in FIG. 3A is the transformer T2 and the peripheral circuits thereof. The transformer T2 includes main output winding 101c and auxiliary output winding 101d, wherein the auxiliary output winding 101d provides power to the constant current/voltage control circuit 108 through a flyback circuit. As shown in FIG. 3A, the first terminal of the main output winding 101c is connected to the second terminal of the main output winding 101c through a first diode D9 and a first capacitor C9, which are series connected, wherein the first terminal of the main output winding 101c is connected to the positive electrode of the first diode D9, the first terminal of the auxiliary output winding 101d is connected to the first terminal of the main output winding 101c and also connected to the positive electrode of the first diode D9, the second terminal of the auxiliary output winding 101d is connected to the second terminal of the main output winding 101c through second diode D8, resistor R12 and second capacitor C10, which are series connected, and one end of the second capacitor C10 is connected to one end of the first capacitor C9. Further, a connecting point located between the resistor R12 and the second capacitor C10 is drawn out for providing power to the optical coupling element U3 and the constant voltage/current control circuit 108. Utilizing the flyback circuit constituted by the second diode D8, the resistor R12 and the second capacitor C10 to supply power for the optical coupling element U3 and the constant voltage/current control circuit 108 makes the EMC characteristic, short circuit characteristic and output characteristic of the circuit 300A superior to the charger circuits 100A and 200A in FIGS. 1A and 2A.

Figure 2B:
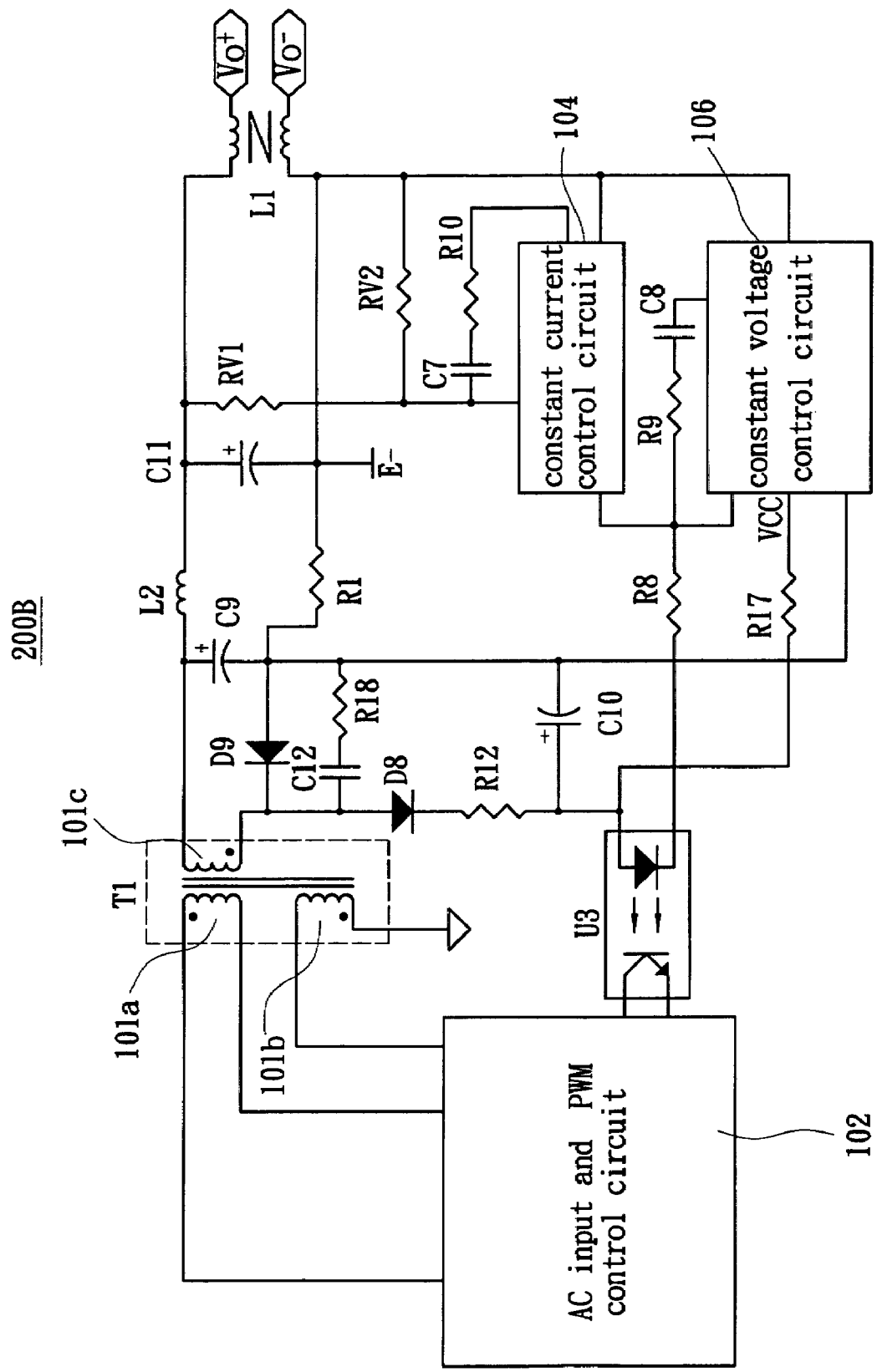
FIG. 2B is a circuit diagram showing the extended design of the second kind of charger circuit shown in FIG. 2A.
Figure 3B:
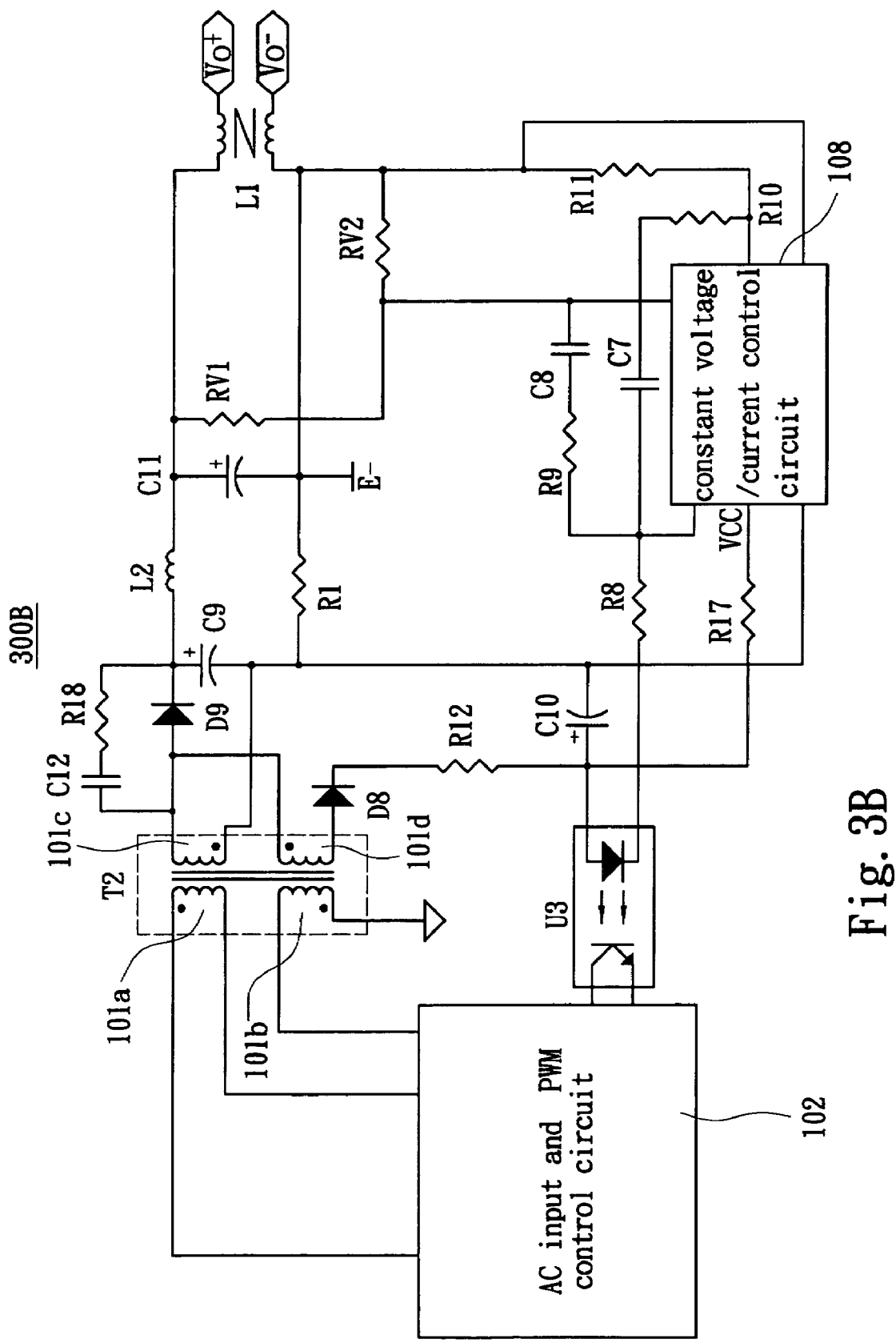
FIG. 3B a circuit diagram showing the extended design of the charger circuit shown in FIG. 3A.

FIG. 3B discloses the extension circuit 300B for the circuit 300A. Comparing with circuits 100B and 200B, the circuit 300B adopts one single constant current/voltage control circuit 108 to substitute the constant current control circuit 104 and the constant voltage control circuit 106, which are original separated. In the circuit 300B, resistors RV1 and RV2 are voltage stabilizing resistors, resistor R10 and capacitor C7 are voltage compensative elements, resistor R9 and capacitor C8 are current compensative elements, RI is constant current resistor, inductances L1 and L2 are filtering inductances, and other elements, including capacitor C11, and resistors R8, R17, are auxiliary electronic elements. Although all the elements described above are connected in a different way from those in FIGS. 1B and 2B, the principles thereof are identical for one skilled in the art.

The improvement of the charger circuit 300B in FIG. 3B is the transformer T2 and the peripheral circuits thereof. The transformer T2 includes main output winding 101c and auxiliary output winding 101d, wherein the auxiliary output winding 101d provides power to the constant current/voltage control circuit 108 through a flyback circuit. As shown in FIG. 3B, the first terminal of the main output winding 101c is connected to the second terminal of the main output winding 101c through a parallel circuit and a first capacitor C9, wherein the parallel circuit includes a first branch circuit constituted by capacitor C12 and resistor R18, which are series connected, and a second branch circuit constituted by a first diode D9; the first terminal of the auxiliary output winding 101d is connected to the first terminal of the main output winding 101c and also connected to the positive electrode of the first diode D9; the second terminal of the auxiliary output winding 101d is connected to the second terminal of the main output winding 101c through second diode D8, resistor R12 and second capacitor C10, which are series connected, and one end of the second capacitor C10 is connected to one end of the first capacitor C9. Further, a connecting point located between the resistor R12 and the second capacitor C10 is drawn out for providing power to the optical coupling element U3 and the constant voltage/current control circuit 108. Utilizing the flyback circuit constituted by the second diode D8, the resistor R12 and the second capacitor C10 to supply power for the optical coupling element U3 and the constant voltage/current control circuit 108 makes the EMC characteristic, short circuit characteristic and output characteristic of the circuit 300B superior to the charger circuits 100B and 200B in FIGS. 1B and 2B.

Figure 4:
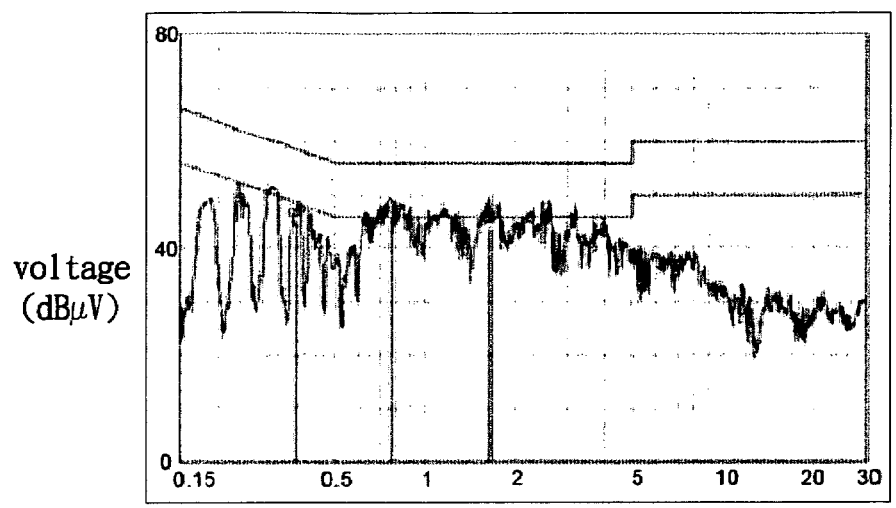
FIG. 4 is the testing result of conduction characteristic of electromagnetic compatibility (EMC) for the embodiment shown in FIG. 3B.
Figure 5:
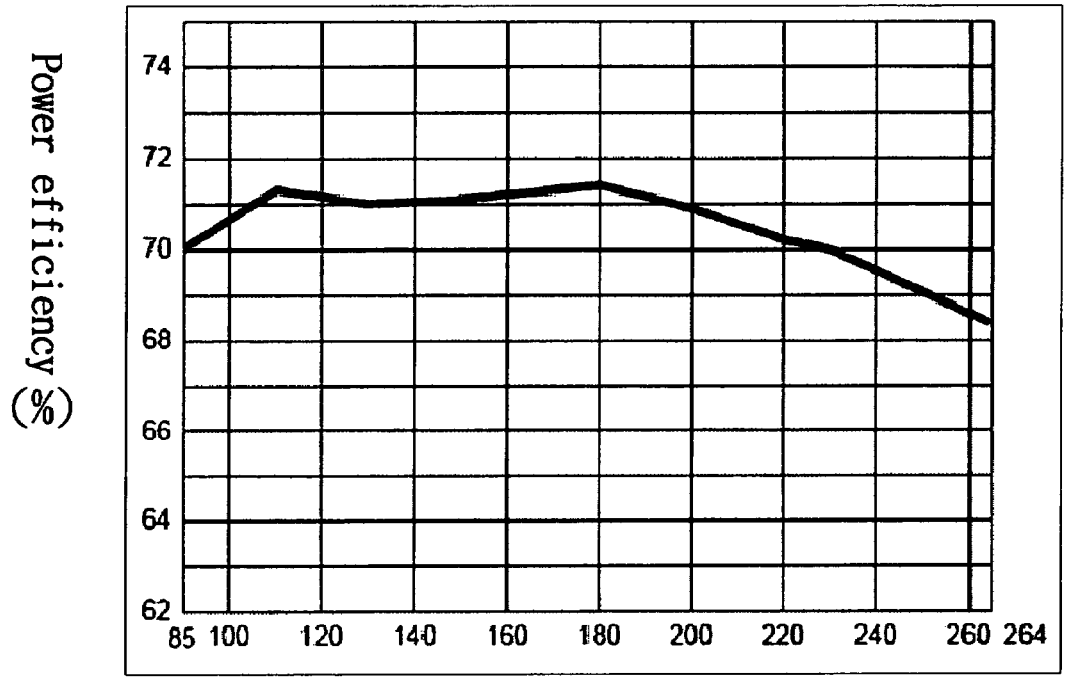
FIG. 5 is the testing result of conversion efficiency for the embodiment shown in FIG. 3B.
Figure 6:
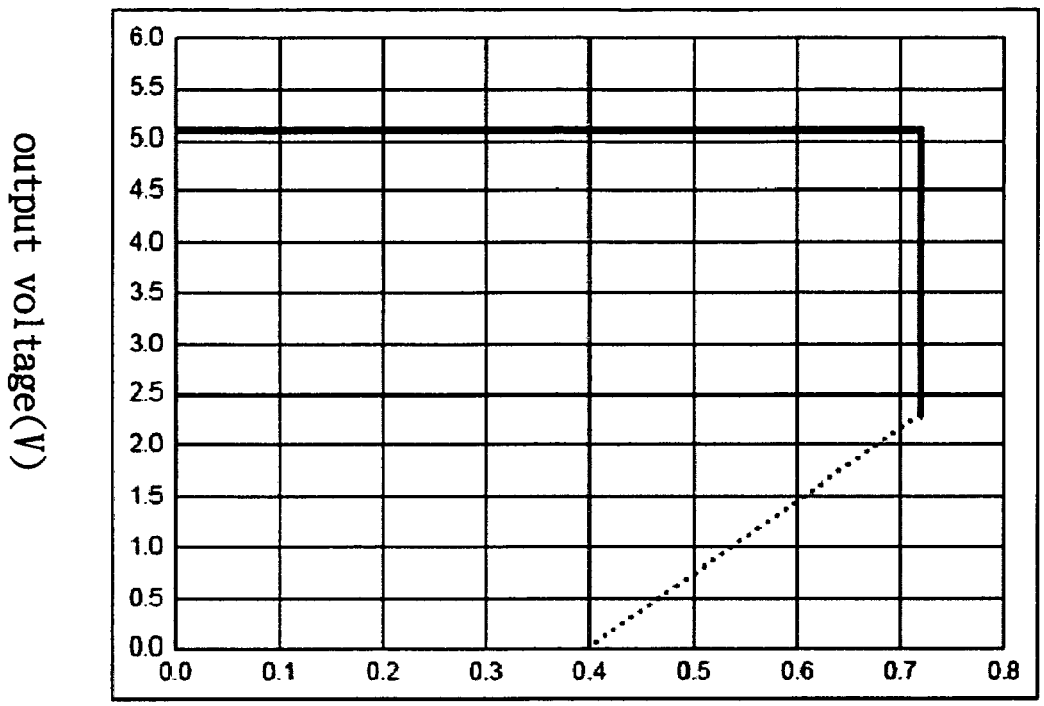
FIG. 6 is the testing result of output characteristic for the embodiment shown in FIG. 3B.

FIGS. 4 to 6 are the testing results of EMC characteristic, short circuit characteristic and output characteristic for the embodiment shown in FIG. 3B, and FIGS. 7 to 9 are the testing results of EMC characteristic, short circuit characteristic and output characteristic for the conventional charger circuits, including the circuit 100B and the circuit 200B.

Figure 1B:
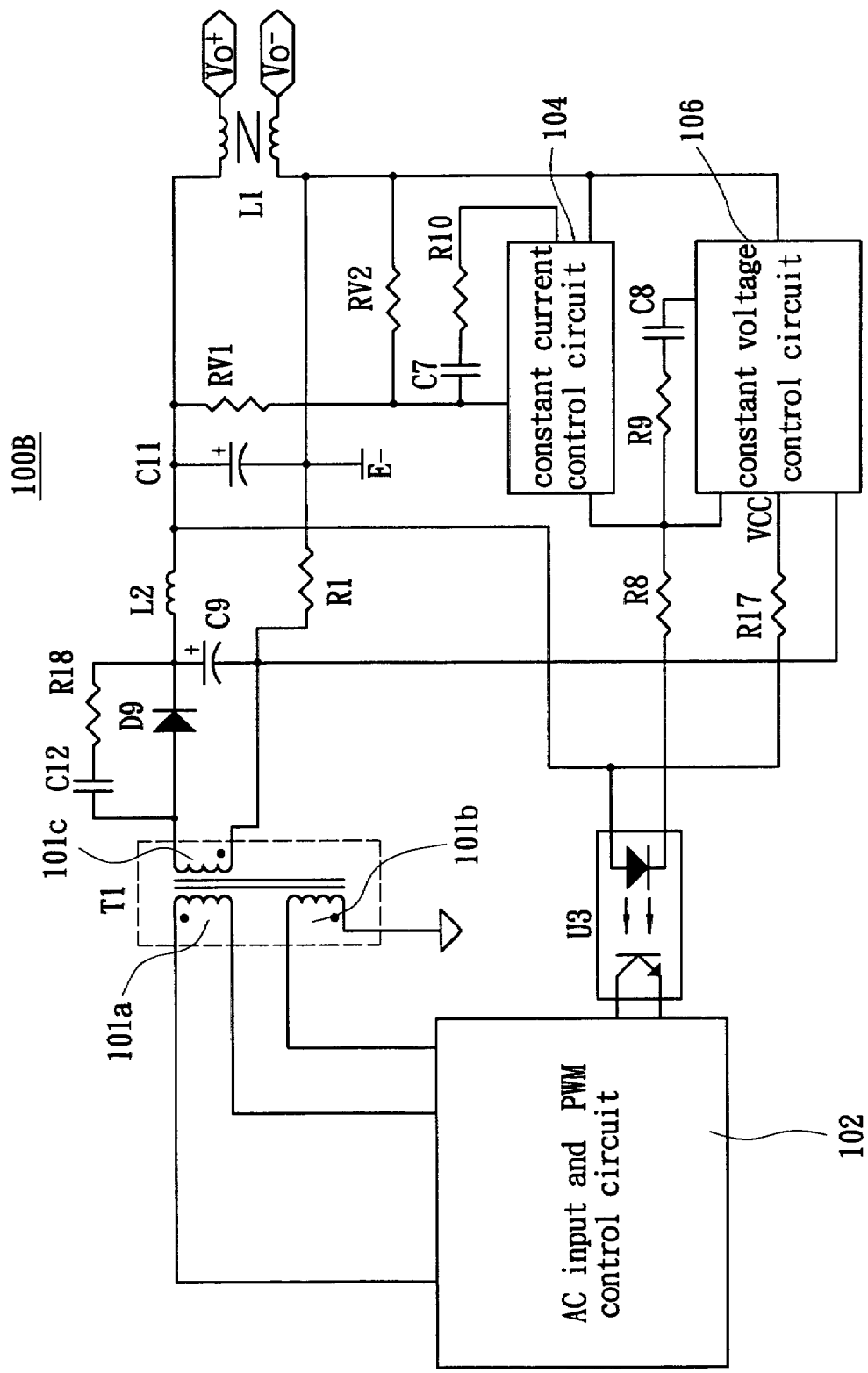
FIG. 1B is a circuit diagram showing the extended design of the first kind of charger circuit shown in FIG. 1A.
Figure 7:
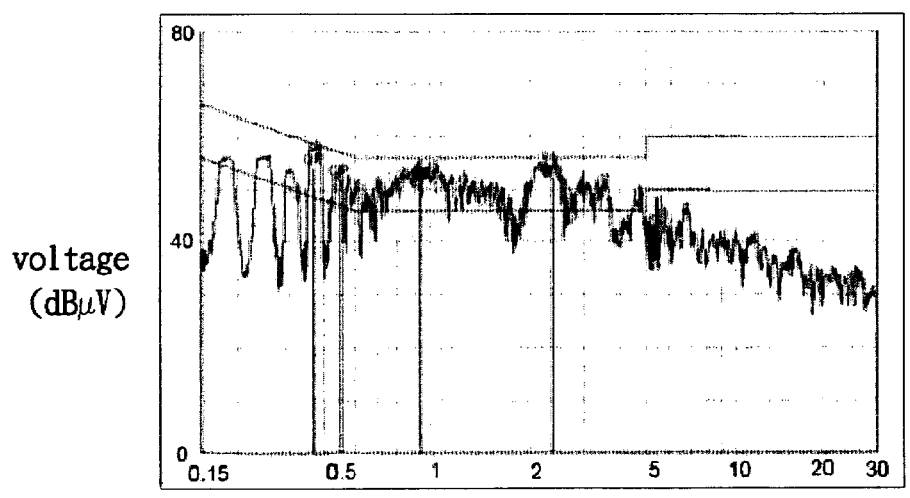
FIG. 7 is the testing result of conduction characteristic of EMC for the conventional charger circuit shown in FIG. 1B.
Figure 8:
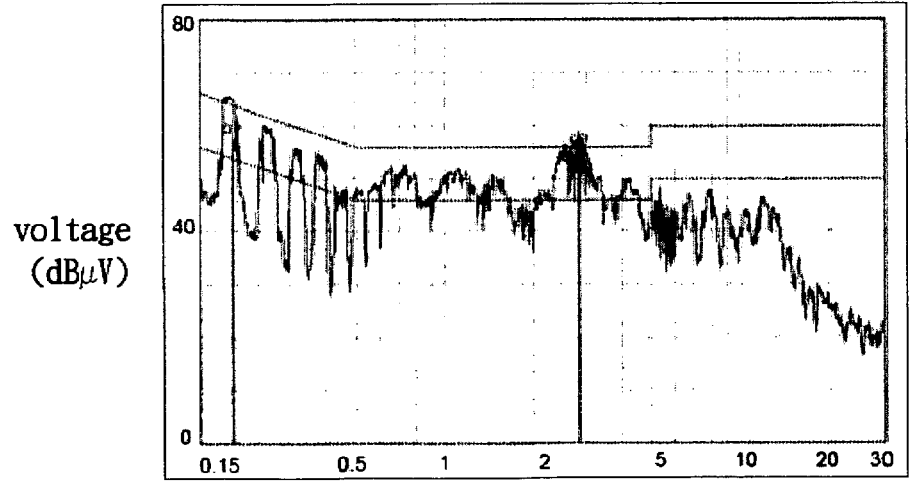
FIG. 8 is the testing result of conduction characteristic of EMC for the conventional charger circuit shown in FIG. 2B.

First, FIG. 4 is compared with FIGS. 7 and 8, wherein FIG. 4 is the testing result of conduction characteristic of electromagnetic compatibility (EMC) for the embodiment shown in FIG. 3B, FIG. 7 is the testing result of conduction characteristic of electromagnetic compatibility (EMC) for the conventional charger circuit shown in FIG. 1B, and FIG. 8 is the testing result of conduction characteristic of electromagnetic compatibility (EMC) for the conventional charger circuit shown in FIG. 2B. Therefore, it is clear that the conduction testing result of EMC for the circuit 300B according to the present invention is approximately 7 dB lower than those in FIGS. 1B and 2B.

Figure 9:
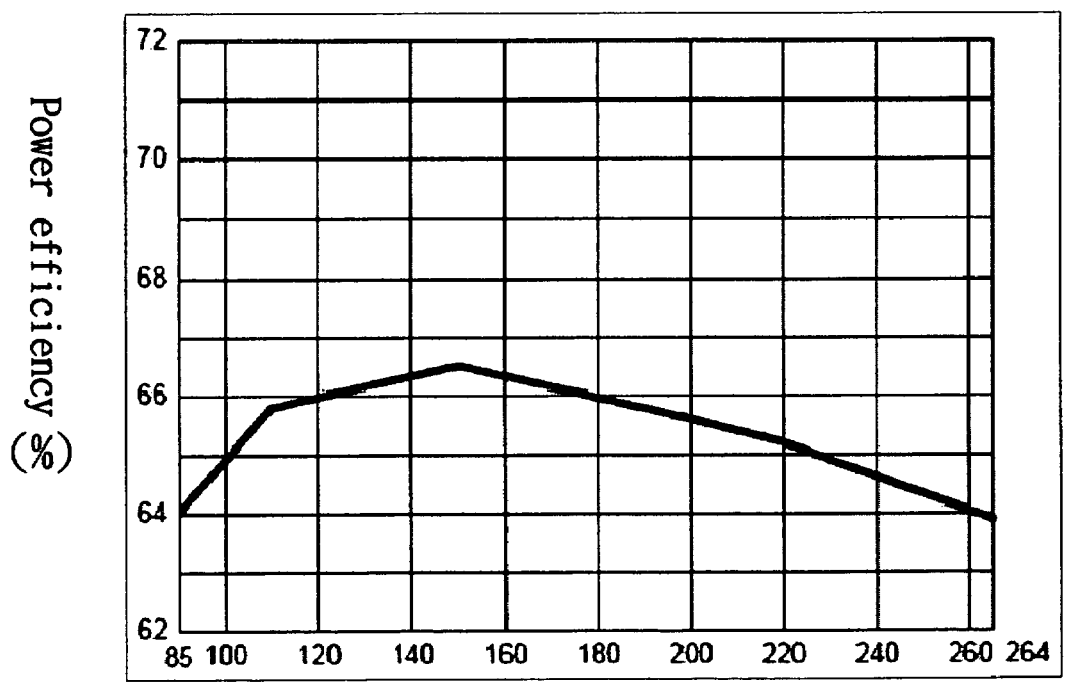
FIG. 9 is the testing result of conversion efficiency for the conventional charger circuit shown in FIG. 1B or 2B.

Then, FIG. 5 is compared with FIG. 9, wherein FIG. 5 is the testing result of conversion efficiency for the embodiment shown in FIG. 3B, and FIG. 9 is the testing result of conversion efficiency for the conventional charger circuit shown in FIG. 1B or 2B. Therefore, it is clear that the conversion efficiency of the circuit 300B according to the present invention is 10% higher than those in FIG. 1B or 2B.

Figure 10:
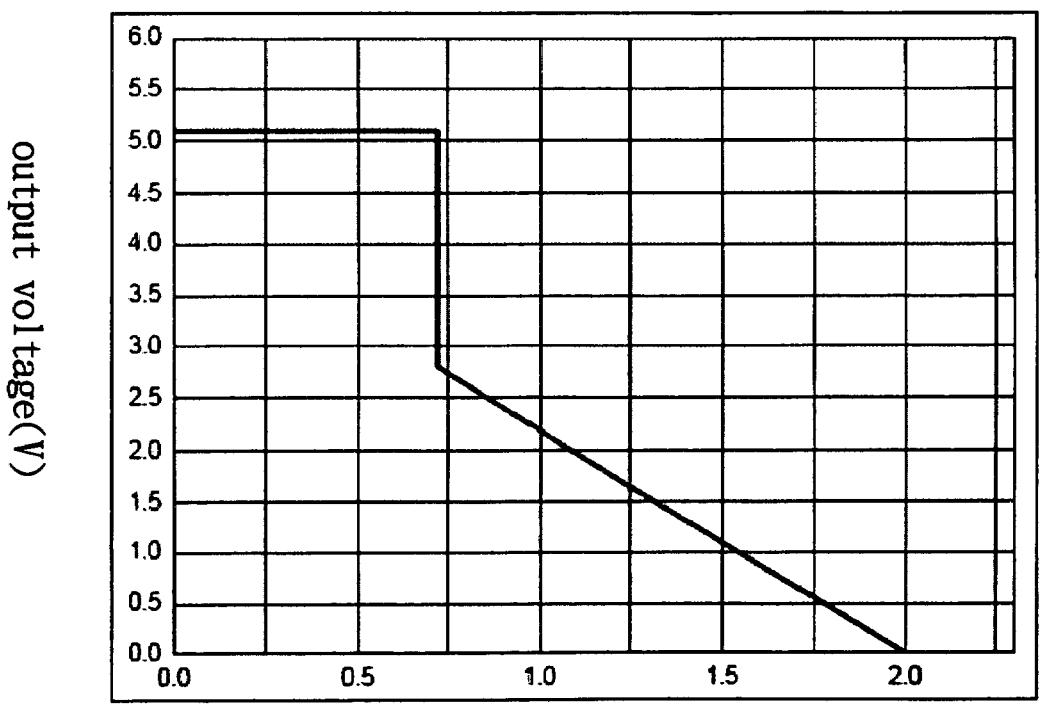
FIG. 10 is the testing result of output characteristic for the conventional charger circuit shown in FIG. 1B or 2B.

Finally, FIG. 6 is compared with FIG. 10, wherein FIG. 6 is the testing result of output characteristic for the embodiment shown in FIG. 3B, and FIG. 10 is the testing result of output characteristic for the conventional charger circuit shown in FIG. 1B or 2B. Therefore, it is clear that the circuit 300B according to the present invention has the best short circuit characteristic than those in FIG. 1B or 2B.

Consequently, the high performance charger circuit according to the present invention can significantly improve electromagnetic compatibility, conversion efficiency and short circuit characteristic.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A transformer used in a charger circuit, in which the input side of the transformer is connected to an AC input and PWM control circuit of the charger circuit, and the output side of the transformer is connected to a constant current and/or constant voltage control circuit of the charger circuit. The AC input, PWM control circuit, constant current and/or constant voltage control circuit are coupled through an optical coupling element, wherein:

the transformer comprises a main output winding and an auxiliary output winding, and the auxiliary output winding is used to supply power for the optical coupling element and the constant current and/or constant voltage control circuit.

2. The transformer as claimed in claim 1, wherein the main output winding and the auxiliary output winding are series connected or are independent windings.

3. The transformer as claimed in claim 2, wherein the auxiliary output winding supplies power for the constant current and/or constant voltage control circuit through a flyback circuit.

4. The transformer as claimed in claim 3, wherein the first end of the main output winding is connected to the positive electrode of a first diode, the positive electrode of the first diode is connected to the positive terminal of a first capacitor, and the negative terminal of the first capacitor is connected to the second terminal of the main output winding; and the first terminal of the auxiliary output winding is connected to the first terminal of the main output winding and also connected to the positive electrode of the first diode, the second terminal of the auxiliary winding is connected to the optical coupling element, the constant current and/or constant voltage control circuit through the second diode, resistor and the second capacitor, which are series connected.

5. The transformer as claimed in claim 4, wherein a connecting point located between the resistor and the second capacitor is drawn out for providing power to the optical coupling element and the constant current and/or constant voltage control circuit.

6. A charger circuit, comprising an AC input and PWM control circuit, a transformer, and a constant current constant voltage control circuit, wherein the constant current constant voltage control circuit and the AC input and PWM control circuit are coupled through an optical coupling element, the input side of the transformer is connected to the AC input and PWM control circuit of the charger circuit, and the output side of the transformer is connected to the constant current constant voltage control circuit of the charger circuit, characterized in that:

the transformer comprises a main output winding and an auxiliary output winding, and the auxiliary output winding is used to supply power for the optical coupling element and the constant current constant voltage control circuit.

7. The charger circuit as claimed in claim 6, wherein the main output winding and the auxiliary output winding are series connected or are independent windings.

8. The charger circuit as claimed in claim 7, wherein the auxiliary output winding supplies power for the constant current constant voltage control circuit through a flyback circuit.

9. The charger circuit as claimed in claim 8, wherein the first end of the main output winding is connected to the positive electrode of a first diode, the positive electrode of the first diode is connected to the positive terminal of a first capacitor, and the negative terminal of the first capacitor is connected to the second terminal of the main output winding; and the first terminal of the auxiliary output winding is connected to the first terminal of the main output winding and also connected to the positive electrode of the first diode, the second terminal of the auxiliary winding is connected to the optical coupling element and the constant current constant voltage control circuit through the second diode, resistor and the second capacitor, which are series connected.

10. The charger circuit as claimed in claim 9, wherein a connecting point located between the resistor and the second capacitor is drawn out for providing power for the optical coupling element, the constant current, and/or constant voltage control circuit.

* * * * *